United States Patent [19]

Novak et al.

[11] Patent Number: 5,525,688

[45] Date of Patent: Jun. 11, 1996

[54] HIGHLY ACTIVE π-ALLYNICKEL-BASED POLYMERIZATION INITIATORS

[75] Inventors: Bruce Novak, Amherst; Timothy J. Deming, Sunderland, both of Mass.

[73] Assignee: The Regents of the University of California, Oakland, Calif.

[21] Appl. No.: 342,805

[22] Filed: Nov. 21, 1994

Related U.S. Application Data

[62] Division of Ser. No. 150,479, Nov. 15, 1993, Pat. No. 5,395,811.

[51] Int. Cl.$^6$ .................................................. C08F 4/82
[52] U.S. Cl. .................... 526/135; 526/171; 526/340.4; 526/340.2; 526/281; 526/292.9; 526/279; 526/346; 528/422
[58] Field of Search .................................. 526/135, 171; 528/422

[56] References Cited

U.S. PATENT DOCUMENTS

| | | | |
|---|---|---|---|
| 3,644,564 | 2/1972 | van Zwet | 585/520 |
| 3,719,653 | 6/1973 | Dawans | 526/135 |
| 3,892,722 | 1/1975 | Babitsky et al. | 526/92 |
| 3,919,133 | 11/1975 | Dawans et al. | 526/193 |
| 5,216,083 | 1/1993 | Grubbs et al. | 525/326.5 |

OTHER PUBLICATIONS

Hadjiandreou et al. *Macromolecules* 17, pp. 2455–2456 (1984) "Butadien 1,4–Polymerization Initiated by Bis [(η$^3$–allyl)(trifluoracetato)nickel]: A Perfectly Living Coordination System".

Lugli et al. *Inorganica Chimica Acta* 3, 1 pp. 151–154 (1969) "Reaction of π–Allylic Nickel Complexes with Quinones and Their Catalytic Activity".

Kormer et al. *Jour. of Polymer Science, Part C.* 16, pp. 4351–4360 (1969) "Polymerization of Butadiene with π–Allylic Catalysts".

Porri et al. *Jour. of Polymer Science, Part C.* 16, pp. 2525–2537 (1967) "Stereospecific Polymerization of Butadiene by Catalysts Prepared from π–Allyl Nickel Halides".

Deming, et al. *Macromolecules* 24, 22, pp. 6043–6045 (1991) "Polyisocyanides Using [(η$^3$–C$_3$H$_5$)Ni(OC(O)CF$_3$)]$_2$: Rational Design and Implementation of a Living Polymerization Catalyst".

Fayt et al. *Jour. of Polymer Science: Polymer Chemistry Edition*, 23 pp. 337–342 (1985) "Molecular Design of Multicomponent Polymer Systems. VII. Emulsifying Effect of Poly(ethylene–b–styrene) Copolymer in High–Density Polyethylene/Polystyrene Blends".

Durand et al. *Polymer Letters*, 8 pp. 743–747 (1970) "Stereospecific Polymerization of Isoprene by Monometallic Nickel Catalysts".

Kormer et al. *Jour. of Polymer Science, Part A–1*, vol. 10 pp. 251–258 (1972) "Cycloolefin Polymerization Initiated by Transition Metal–π–Allylic Complexes".

Dawans et al. *Ind. Eng. Chem. Prod. Res. Develop.*, 10,3 pp. 261–269 (1971) "π–Allyl–Type Polymerization".

Azizov *Doklady Physical Chemistry* 265, 1–3, pp. 518–521 (1982) "Mechanism of the Formation of Active Sites in Catalytic Systems Based on πAlkenyl Complexes of Nickel and Carbonyl–Containing Electron Acceptors".

Primary Examiner—Mark Nagumo
Attorney, Agent, or Firm—Flehr, Hohbach, Test, Albritton & Herbert

[57] ABSTRACT

A π-allylnickel/counterion complex is reacted with a hologenated ketone to produce a highly active polymerization initiator.

9 Claims, 1 Drawing Sheet

Π-allylnickel trifluoroacetate
ORANGE SOLUTION

HFA
COLORLESS GAS

COMPLEX I
RED SOLUTION

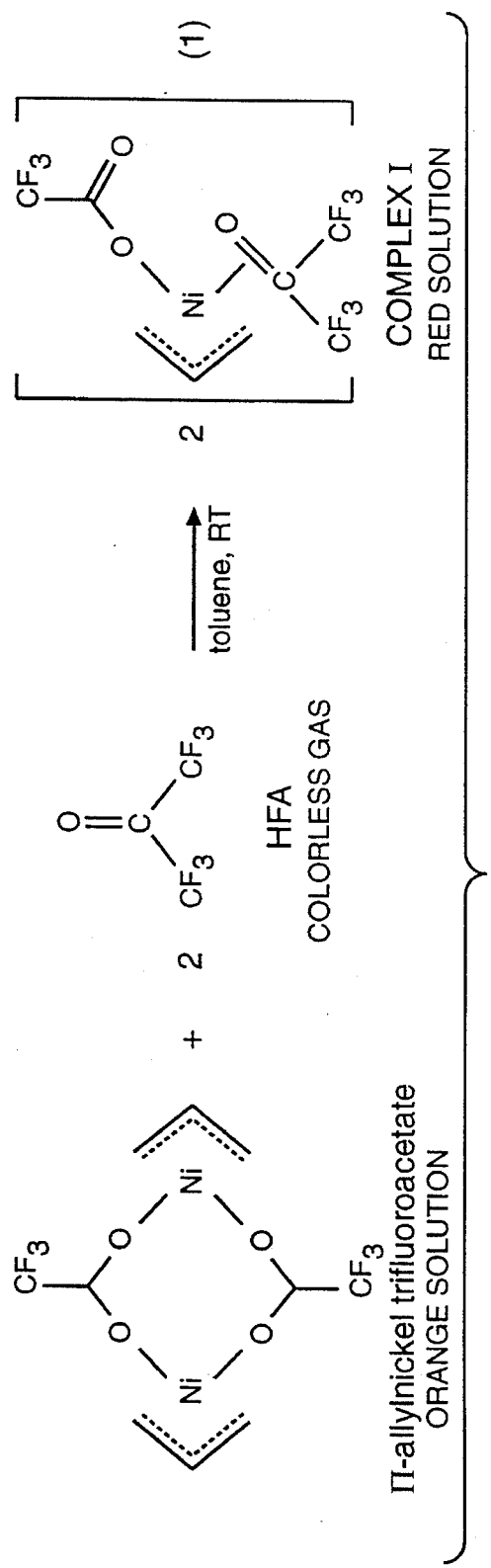
FIG._1A
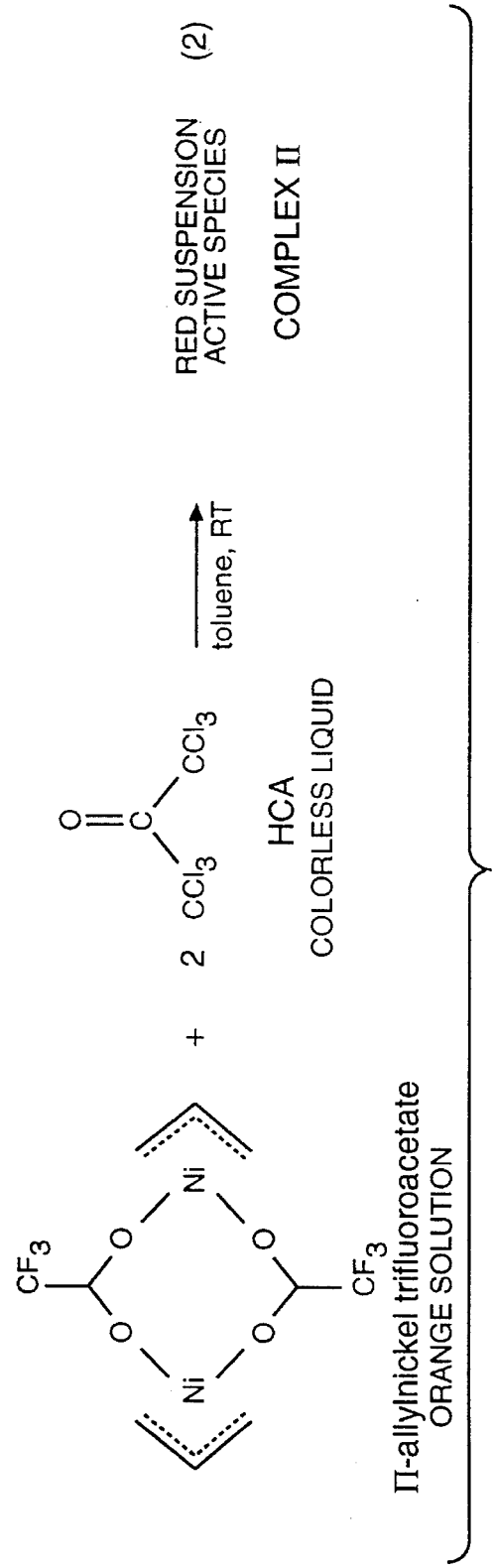
FIG._1B

HIGHLY ACTIVE π-ALLYLNICKEL-BASED POLYMERIZATION INITIATORS

This invention was made with Government support under Grant (Contract) No. the National Science Foundation. The Government has certain rights to this invention.

This is a division of application Ser. No. 08/150,479 filed 15 Nov. 1993, now U.S. Pat. No. 5,395,811.

BACKGROUND OF THE INVENTION

The utilization of transition metals as polymerization catalysts has led to many vast improvements in the industrial synthesis of polymeric materials. Some examples of these improvements are higher rates of monomer consumption, polymer molecular weight control, and stereochemical control over polymer microstructure.

Stereochemical control of polymerization using π-allylic complexes of transition metals was reported by G. Wilke who obtained a polybutadiene with a predominantly cis-1,4 content using (π-allyl)$_2$Co(I) as the catalyst, and a high 1,2-polybutadiene with a (π-allyl)$_3$Cr [*Angew. Chem. (Intern. Ed.)*, 2: 105 (1963)]. Porri et al. disclosed polymerization of butadiene by bis-(π-allyl nickel iodide) to crystalline trans-1,4-polymer and by bis-(π-allyl nickel chloride) to a predominantly cis-1,4-polymer [*J. of Polymer Science*, 16:2525–2537 (1967)]. After these studies were reported, numerous others have investigated the stereospecific polymerization with π-allylic derivatives of transition metals.

For example, U.S. Pat. No. 3,719,653 to Dawans describes a stereospecific polymerization of conjugated diolefins with a catalyst which is the reaction product of allyl halogenacetate and nickel carbonyl or nickel olefin complex. One reaction product, π-allylnickel trifluoroacetate, is disclosed as being a fairly active initiator for the polymerization of 1,3-butadiene.

Π-allylnickel trifluoracetate has also been shown to be a fairly active initiator for the polymerization of other monomers. For example, Kormer et al. demostrated the polymerization of cycloolefins [*J. Poly. Sci. Pt. A-1* 10:251–258 (1971)]. Durand et al. showed that the addition of ligands to a π-allylic nickel trifluoroacetate catalyst system can influence the stereospecific course of the polymerization reaction of isoprene [*Polym. Lett.* 8:743–747 (1970)]. Fayt et al. show block copolymers of butadiene and styrene formed by the polymerization of butadiene using a π-allylic nickel trifluoroacetate catalyst and a chloranil ligand with the subsequent addition of styrene monomer and additional ligand [*J. Poly. Sci. Polym. Chem. Ed.* 23:337–342 (1985)]. It has been reported that allylnickel compounds have also been promoted to active initiators by the addition of electron-deficient additives such as TiCl$_4$, AlCl$_3$, chloranil, and bromanil [Porri et al., supra; Hadjiandreou et al. *Macromolecules* 17:2455–2456 (1984)]; however, results using chloranil have been unreproducible [Novak et al., unpublished results]. The polymerization of isocyanides using π-allylic nickel trifluoroacetate catalysts was demonstrated by Deming et al. [*Macromolecules* 24:6043–6045 (1991)]. Additionally, it has been reported that chloral, trichloracetic acid, and hexachloroacetone were added to some allylnickel halides to prepare polybutadiene [Azizov *Dokl. Akad. Nauk SSSR* 265(2):362 (1982)].

Current goals in polymer syntheses using metal initiators include increasing conversion rates and stereochemical control, as well as the polymerization of monomers containing polar functional groups. While stereochemical control in the polymerization of various monomers using π-allylnickel halogenacetates has been demonstrated, the activity of these systems are generally fairly low. It would be desirable to increase the monomer consumption in these systems, while maintaining or improving stereoselectivity. In addition, it would be desirable to have a system that is capable of polymerizing a variety of monomers.

SUMMARY OF THE INVENTION

Given the foregoing inefficiencies attendant with the prior art of polymerization techniques, it is an object of the present invention to provide a polymerization system employing π-allylnickel compounds, having high stereoselectivity and activity.

It is also an object of the present invention to provide a process for polymerization that can be used with a wide variety of monomers.

These and other objects and features of the present invention will become apparent to those skilled in the art from the following detailed description of the invention in conjunction with the appended claims.

The foregoing objectives are achieved by a process of increasing the catalytic activity of a π-allylnickel/counterion complex comprising mixing a solution of the π-allylnickel/counterion complex with a hologenated ketone additive to form a highly active π-allylnickel-based polymerization initiator. The highly active π-allylnickel-based polymerization initiators of this invention exhibit increased activity and polymerize a wider variety of monomers compared to that of the π-allylnickel/counterion complexes from which they are derived.

In a preferred embodiment, the counterion is a carboxylate. A preferred carboxylate is a halogenacetate. A presently preferred halogenacetate is trifluoroacetate.

In one embodiment, the highly active π-allylnickel-based polymerization initiator is formed by mixing a solution of π-allylnickel trifluoroacetate with either hexafluoroacetone or hexachloroacetone A process for forming a polymer is also disclosed which comprises mixing a solution of a π-allylnickel/counterion complex with a halogenated ketone additive to form a highly active π-allylnickel-based polymerization initiator, and adding a polymerizable monomer to the highly active π-allylnickel-based polymerization initiator to form the polymer. Polymerizable monomers which can be used in the process include butadiene, isoprene, ethyl vinyl ether, chloroetheyl vinyl ether, trimethylsilyloxy vinyl ether, and norbornene.

BRIEF DESCRIPTION OF THE DRAWINGS

FIG. 1*a* depicts the reaction scheme of π-allylnickel trifluoroacetate with hexafluoroacetone which results in Complex I, a highly active π-allylnickel-based polymerization initiator.

FIG. 1*b* depicts the reaction scheme of π-allylnickel trifluoroacetate with hexachloroacetone which results in Complex II, a highly active π-allylnickel-based polymerization initiator.

DETAILED DESCRIPTION OF THE INVENTION

The present invention pertains to a process of greatly increasing the catalytic activity of π-allylnickel/counterion complexes utilizing halogenated ketones as unique co-initiators. These polymerization initiators have the highest activity of any known nickel complex toward the polymerization of butadiene. One of the embodiments of the present invention is capable of preparing polybutadienes of nearly pure cis-1,4, microstructure at rates much higher than other catalysts of similar selectivity. The invention also pertains to processes for forming polymers utilizing the activated π-allylnickel-based polymerization initiators.

Suitable π-allylnickel/counterion complexes have the general structure:

(1)

wherein X is a counterion. Suitable counterions include carboxylates, such as acetates and benzoates; halogens, such as $Br^-$ and $I^-$; halogen-containing ions, such as $PF_6^-$ and $BF_4^-$; and the like. Particularly preferred counterions are carboxylates. The use of π-allylnickel carboxylates for the catalysis of monomers is known. Presently preferred carboxylates are the π-allylnickel halogenacetates having the general structure of formula (1) above wherein the counterion, X, is represented by the general formula:

(2)

wherein Y is halogen, and n is an integer from 1 to 3. A preferred π-allylnickel halogenacetate is π-allylnickel trifluoroacetate. Such catalysts can be made utilizing the methods disclosed in U.S. Pat. No. 3,719,653 (incorporated herein by reference).

The polymerization catalytic activity of the π-allylnickel/counterion complex is greatly increased by its reaction with a halogenated ketone initiator. Prior to the present invention, ketones were not recognized as effective co-initiators of nickel catalysis systems. The halogenated ketone initiators of the present invention have the general structure:

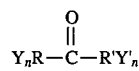
(3)

wherein R and R' are selected from the group consisting of carbon and alkyl, Y and Y' are halogens, and n is an integer from 1 to 3. The alkyl groups can be saturated or unsaturated, substituted or unsubstituted and generally have from about 1 to about 10 carbons, although longer chains are possible. Preferred ketone initiators are hexafluoroacetone (HFA) and hexachloroacetone (HCA), which are represented by the following formulas:

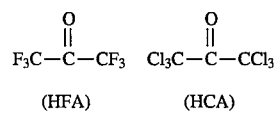

(HFA)      (HCA)

The synthesis of the highly active π-allyl nickel-based polymerization initiator is conducted under conditions to exclude air, such as under dinitrogen atmosphere. Generally, the π-allylnickel/counterion complex is dissolved in a solvent and the halogenated ketone initiator is added. Preferably the molar ratio of halogenated ketone initiator to π-allylnickel/counterion complex is 1:1 or greater. More preferably, the halogenated ketone initiator is added in excess. Suitable solvents include aromatic and ethereal solvents such as tetrahydrofuran, benzene, toluene, diethyl ether, dimethyl ether, xylene, chlorobenzene, dichlorobenzene, and the like. However, because some polymerizations can be run without solvent in the pure monomer (i.e. bulk polymerization), it is not required to synthesize the highly active π-allylnickel-based polymerization initiator in the presence of solvent. For example, the halogenated ketone initiator may be dissolved in norbornene to which the π-allylnickel/counterion complex is added.

After the two reactants are allowed to react, the solvent can be removed in vacuo to separate out the resulting highly active π-allyl nickel-based polymerization initiator.

A preferred highly active π-allyl nickel-based polymerization initiator is the reaction product of π-allylnickel trifluoroacetate and HFA, the reaction scheme and the resulting product are depicted in FIG. 1a. The product, herein after referred to as Complex I, exists as a red homogenous solution in the solvent directly upon preparation and can be isolated by the removal of the solvent. This material is soluble in ethereal and aromatic solvents and retains its catalytic activity indefinitely when stored without solvent.

Another preferred highly active π-allyl nickel-based polymerization initiator is the reaction product of π-allylnickel trifluoroacetate and HCA, the reaction scheme and the resulting product are depicted in FIG. 1b. The product, herein after referred to as Complex II, exists as a cream/red suspension in solvent directly upon preparation, and the active part of the mixture is only a small fraction (ca. 10%) of the total added components. Analysis of the solid residue from Complex II indicated it to be chloronickel trifluoracetate, and the main constituent of the supernatant proved to be 1,1,1-trichloro-3,3-dichlorohex-5-en-2-one.

The systems presented herein have been shown to polymerize a wide variety of unsaturated monomers, not only dienes. These systems can polymerize vinyl ethers and protected vinyl alcohols and thus allow the formation of polymers having ether and alcohol groups. The vinyl alcohols can be protected using standard organic procedures known in the art, for example (trimethylsilyl)oxyvinyl ether. To prepare polymers using the highly active π-allyl nickel-based polymerization initiator of the present invention, polymerizable monomers are transferred, preferably under vacuum, to the reaction mixture of the halogenated ketone initiator and π-allylnickel/counterion complex. In comparison to π-allylnickel trifluoroacetate (both with and without other co-initiators), the highly active π-allyl nickel-based polymerization initiators of the present invention result in more rapid monomer consumption. In addition, the stereoregularity of the resulting polymers is generally increased as well as the amount of polymer.

In order that the invention described herein may be more fully understood, the following examples are set forth. It should be understood that these examples are for illustrative purposes only and are not to be construed as limiting the scope of the invention in any manner.

EXAMPLES

General

The synthesis and subsequent manipulations of the complexes described below were conducted under dinitrogen atmosphere with the rigorous exclusion of air and water by using Schlenk line and glove box (Vacuum Atmospheres HE 553 Dri Lab with attached IIE 493 Dri Train) techniques. Gel permeation chromotography (GPC) was performed using $CHCl_3$ mobile phase on a Hewlett/Packard 1050 series liquid chromatograph pump equipped with a HP model 1047 refractive index detector and HP model 3396A integrator. Separations were effected by $10^5$ Å, $10^4$ Å, $10^3$ Å, and 500 Å Waters Ultrastryagel columns connected in series, and molecular weights were calibrated relative to polystyrene standards. NMR spectra were recorded on a Bruker AM-400 spectrometer and $^{13}$C {$^1$H} and $^1$H spectra were referenced to internal solvent resonances. $^{19}$F spectra were referenced to external $C_6H_5CF_3$ set at −60.0 ppm. Butadiene and hexafluoroacetone were purified by distillation from $CaH_2$ under vacuum at −78° C. into $N_2(1)$ cooled receiving flasks. Norbornene was purified by distillation from Na metal under $N_2$. Isoprene was washed with dilute aq. NaOH, dried with $MgSO_4$, and then vacuum transferred from $CaH_2$ before use. $CD_3CN$, 2-chloroethyl vinyl ether, vinyloxy trimethylsilane, and styrene were all vacuum transferred from $CaH_2$ and were stored at −30° C. under nitrogen before use. Hexachloroacetone was distilled in vacuo from $CaH_2$. $CDCl_3$ was vacuum transferred from $P_2O_5$.

$[\eta^3\text{-}C_3H_5)Ni(OC(O)CF_3]_2$, I, and 1-phenylethyl isocyanide were prepared as previously described [Deming et al. *Macromolecules* 24:6043 (1991)].

Example 1

Preparation of Complex I

In the glove box, π-allylnickel trifluoroacetate (50 mg, 0.118 mmol), dissolved in diethyl ether (20 ml), was added to a 100 ml thick walled glass tube (fused to a high vacuum stopcock) which was then frozen in $N_2(1)$ and brought under vacuum on a Schlenk line. Excess hexafluoroacetone (ca. 1 ml) was then added and the sealed flask was thawed to room temperature causing the orange solution to turn a deep red over 10 min. After approximately 30 min, the solvent was removed in vacuo to leave the complex as an oily red solid (58 mg, 75%). The complex had the following characteristics: IR(toluene) 1720, 1680 cm$^{-1}$ (v(CO)br,vs); $^{19}$F NMR ($CDCl_3$:δ-68.0 (br s, $CF_3$). Anal. calcd for the diethyl ether solvate $NiC_8H_5O_3F_9$·$(C_2H_5)_2O$:C, 31.82%; H, 3.34% Found: C, 31.61%; H, 3.09%.

Example 2

Preparation of Complex II

Complex II was prepared in situ by mixing π-allylnickel trifluoroacetate (2.5 mg, 0.0059 mmol), dissolved in toluene (0.5 ml), with hexachloroacetone (1.8 μl, 0.012 mmol) and adding the resulting fine, peach colored suspension to a 100 ml thick walled glass tube (fused to a high vacuum stopcock) which was then frozen in $N_2(1)$ and brought under vacuum on a Schlenk line.

Example 3

Preparation of cis-1,4-Polybutadiene using Complex II

Butadiene (1.50 g, 27.7 mmol; determined by weighing the reaction flask before and after monomer addition) was vacuum transferred into the Complex II reaction mixture prepared in Example 2. After warming the flask to 20° C., the resulting colorless suspension was observed to become completely homogeneous after 1–2 min (elemental Hg added to a polymerization had no effect on the reaction). Polymerization was complete within 10 min as evidenced by the contents of the flask becoming a solid transparent gel.

The polymer was isolated by dissolving in toluene and twice precipitating from methanol which contained dilute HCl (0.01M) and a preservative (BHT, 0.001M). Yield: 1.37 g, 91%. $^{13}$C {$^1$H} NMR and IR analyses revealed that these polymers were generally of >98% cis-1,4 microstructure. IR(NaCl):738 cm$^{-1}$ (v(cis —$CH_2$—C=C—$CH_2$—)vs). $^{13}$C {$^1$H} NMR ($CDCl_3$):δ 129.6 (s, cis—=$\underline{C}$H—$CH_2$—), 27.9 (s, cis=CH—$\underline{C}H_2$—). $M_n$=280,000; PDI=1.7.

Example 4

Preparation of cis-1,4-Polyisoprene Using Complex II

Complex II was prepared in situ using the procedure described in Example 2. Isoprene (0.500 ml, 5.00 mmol) was then added via syringe and the resulting pale yellow suspension was stirred at 50° C. for 24 hours whereupon the mixture became very viscous.

The polymer was isolated by dissolving in toluene and twice precipitating from methanol which contained dilute HCl (0.01M) and a preservative (BHT, 0.001M). Yield: 180 mg, 53%. $^{13}$C {$^1$H} NMR and IR analyses revealed that this polymer was of >98% cis-1,4 microstructure. IR(NaCl):759 cm$^{-1}$ (v(cis—$CH_2$—C=C—$CH_2$)vs). $^1$H NMR ($CDCl_3$):δ 5.12 (br s, >C=C$\underline{H}$—, 1H), 2.02 (m, $\underline{H}_2$C($CH_3$)C=CH—, 2H), 1.60 (m, $H_2$C(C$\underline{H}_3$)C=CH—, 3H), 0.95 (m, $H_2$C($CH_3$)C=CHC$\underline{H}_2$—, 2H). $^{13}$C {$^1$H} NMR ($CDCl_3$):δ 124.3 (s, cis—$CH_2$—($CH_3$)C=CH—$CH_2$), 39.7 (s, cis—$CH_2$—($CH_3$)C=CH—$\underline{C}H_2$), 26.7 (s, cis—$\underline{C}H_2$—($CH_3$)C=CH—$CH_2$—), 16.0 (s, cis—$CH_2$—($\underline{C}H_3$)C=CH—$CH_2$—). $M_n$ =5200; PDI=2.0.

Example 5

Preparation of Poly(2,3-bicyclo[2.2.1]heptane) Using II

Complex II was prepared in situ using the procedure described in Example 2. Norbornene (200 mg, 2.12 mmol) was then added and the resulting pale yellow solution was stirred at 20° C. for 24 h whereupon the mixture became very viscous.

The polymer was isolated by dissolving in toluene and twice precipitating from methanol which contained dilute HCl (0.01M). Yield: 140 mg, 70%. $^1$H NMR ($CDCl_3$):δ 2.35 (br m), 1.70 (br m), 1.54 (br m), 1.11 (br m). $^{13}$C {$^1$H} NMR ($C_6D_3Cl_3$):δ 53 (br m, CH), 47 (br m, CH), 38 (br m, $CH_2$), 35 (br m, $CH_2$), 29 (br m, $CH_2$). $M_n$=112,200; PDI=1.5.

Example 6

Preparation of Poly(2-chloroethoxyethylene) Using II

Complex II was prepared in situ using the procedure described in Example 2. 2-Chloroethyl vinyl ether (0.200 ml, 1.97 mmol) was then added via syringe and the resulting colorless solution was stirred at 20° C. for 24 h whereupon the mixture became very viscous.

The polymer was isolated by dissolving in toluene and twice precipitating from methanol which contained dilute HCl (0.01M). Yield: 201 mg, 96%. $^1$H NMR ($CDCl_3$):δ 3.69 (br m), 3.62 (br m), 1.87 (br m), 1.68 (br m). $^{13}$C {$^1$H} NMR ($CDCl_3$):δ 73.8 (m), 68.8 (m), 49.7 (m), 40.18 (m). $M_n$=86,000; PDI=1.7.

Example 7

Preparation of Poly Vinyl Alcohol Using II

Complex II was prepared in situ using the procedure described in Example 2. Vinyloxy trimethylsilane (0.300 ml, 1.54 mmol) was then added via syringe and the resulting colorless solution was stirred at 40° C. for 24 hours whereupon the mixture became viscous.

The reaction mixture was diluted with n-hexane (5 ml) and methanol (1 ml) and let sit. After about 5 minutes, the white precipitated polymer was isolated by centrifugation and dried in vacuo. Yield: 25 mg, 37%. IR(NaCl):3320 cm$^{-1}$ (v(O—H)br s). $^1$H NMR (DMSO-d$_6$):δ 3.8 (br m, —CH(OH)CH$_2$—), 1.4 (br m, —CH(OH)CH$_2$—). $^{13}$C {$^1$H} NMR (DMSO-d$_6$):δ 66 (m, —CH(OH)CH$_2$ —), 4.5 (m, —CH(OH)CH$_2$—).

Example 8

Preparation of Poly 1-phenylethyl Isocyanide Using II

Complex II was prepared in situ using the procedure described in Example 2. (±)-1-Phenylethyl isocyanide (0.400 ml, 2.93 mmol) was then added via syringe and the resulting bright yellow solution was purged with oxygen for 1 min and stirred at 20° C. for 10 hours whereupon the mixture became a solid orange gel.

The polymer was isolated by dissolving in toluene and twice precipitating from methanol which contained dilute HCl (0.01M). Yield: 376 mg, 98%. IR(CHCl$_3$):1625 cm$^{-1}$ (v(CN), vs). $^{13}$C {$^1$H} NMR (CDCl$_3$):δ 164 (br m, CNCH(CH$_3$)C$_6$H$_5$), 143 (br m, CNCH(CH$_3$—C$_6$H$_5$), 128 (br m, CNCH(CH$_3$)C$_6$H$_5$), 62 (br m, CNCH(CH$_3$)C$_6$H$_5$), 27 (br m, CNCH(CH$_3$)C$_6$H$_5$). M$_n$ =31,500; PDI=1.6.

Example 9

Preparation of Polystyrene Using II

Complex II was prepared in situ by mixing π-allylnickel trifluoroacetate (10.0 mg, 0.0236 mmol), dissolved in toluene (1.0 ml), with hexachloroacetone (7.2 μL, 0.048 mmol) and adding the resulting fine, peach colored suspension to a 100 ml thick walled glass tube (fused at high vacuum stopcock) which contained a stirbar. Styrene (1.50 ml, 13.1 mmol) was then added via syringe and the resulting yellow solution was stirred at 20° C. for 10 h whereupon the mixture became a thick colorless gel.

The polymer was isolated by dissolving in toluene and twice precipitating from methanol which contained dilute HCl (0.01M). Yield: 1.31 g, 96%. $^{13}$C {$^1$H} NMR (CDCl$_3$):δ 146 (m, —CH$_2$CH(CC$_5$H$_5$)—), 128 (m, —CH$_2$CH(CC$_5$H$_5$)—), 46–40 (m, —CH$_2$CH(C$_6$H$_5$)—), 37 (m, —CH$_2$CH(C$_6$H$_5$)—). M$_n$ =2,000; PDI=1.8.

Results

Butadiene polymerization initiated by π-allylnickel trifluoroacetate was found to have a half-life of about 24 hours at 298K. When Complex I was used as an initiator using equal starting concentrations of both butadiene and Complex I, the half-life was reduced to about 0.5 hours. For the same reaction with Complex II, the half-life was shortened even more to about 2 minutes. Furthermore, the stereoregularity of the polymer was increased in going from π-allylnickel trifluoroacetate to Complex I to Complex II. The ratio of cis-1,4 to trans-1,4 units along the backbone was found to increase from 3:1 to 9:1 to 98:1, respectively, as determined by NMR spectroscopy.

In addition, the related monomer, isoprene, which under given conditions (60° C., 20 h) gave only 25% polymer (42% cis, 50% trans, and 8% 3,4-addition) with π-allylnickel trifluoroacetate [Durand et al. *Polym. Lett.* 8: 743 (1970)]. However, with Complex II, and under milder conditions (50° C., 15 h), 53% polymer was obtained and the resulting polymer was of much higher quality (98% cis-1,4 addition).

Cyclic and electron-deficient monomers were also examined. Norbornene is not polymerized by π-allylnickel trifluoroacetate at room temperature. However, when Complex II is used as an initiator, high (70%) yields of addition polymer can be obtained in short time periods (24 h). Using Complex II as an initiator, styrene was polymerized (M$_n$= 2000) at ambient temperature.

Functionalized monomers were also polymerized, namely, vinyl ethers (2-chloroethyl vinyl ether and (trimethylsilyl)oxyvinyl ether). As with cyclic olefins, vinyl ethers are not polymerized by π-allylnickel trifluoroacetate alone. When Complex II is used as an initiator, nearly quantitative yields of addition polymer poly(2-chloroethyl vinyl ether) can be isolated with reasonably high molecular weight (M$_n$=50,000). When (trimethylsilyl)oxy vinyl ether is polymerized, the polymeric product isolated is poly(vinyl alcohol) (37%) after hydrolysis of the oxygen-silicon bond. Thus, Complex II represents a convenient route into alkoxy- and hydroxyl-functionalized polymers.

Table I summarizes the results of these polymerization studies. The catalyst π-allylnickel trifluoroacetate is abbreviated π-ANTFA.

TABLE I

| Monomer | Catalyst | Activity | Polymer Yield (%) |
|---|---|---|---|
| butadiene | π-ANTFA | low | 100 |
|  | Complex I | high | 100 |
|  | Complex II | very high | 100 |
| isoprene | π-ANTFA | very low | 25 |
|  | Complex I | low | ND |
|  | Complex II | very high | 53 |
| ethyl vinyl ether | π-ANTFA | inactive | 0 |
|  | Complex I | high | 100 |
|  | Complex II | very high | 100 |
| 2-chloroethyl vinyl ether | π-ANTFA | inactive | 0 |
|  | Complex I | high | 100 |
|  | Complex II | very high | 100 |
| trimethylsilyloxy vinyl ether | π-ANTFA | inactive | 0 |
|  | Complex I | low | ND |
|  | Complex II | mild | 50 |
| norbornene | π-ANTFA | inactive | 0 |
|  | Complex I | high | 60 |
|  | Complex II | very high | 70 |

All documents referred to herein are hereby expressly incorporated by reference.

What is claimed is:

1. A process of forming a polymer comprising reacting a π-allylnickel/counterion complex having the structure:

(1)

with a hologenated ketone additive having the structure:

(2)

and a polymerizable monomer;

where in structure (1), X is a counterion, and in structure (2), R and R' are selected from the group consisting of carbon, substituted or unsubstituted alkyl, wherein said alkyl group may be unsaturated; Y and Y' are halogens; and n is an integer from 1 to 3.

2. The process of claim 1 wherein said counterion is a carboxylate group.

3. The process of claim 2 wherein said carboxylate is a halogenacetate.

4. The process of claim 3 wherein said halogenacetate is trifluoroacetate.

5. The process of claim 4 wherein said ketone additive is a halogenacetate.

6. The process of claim 5 wherein said halogenacetone is hexafluoroacetone.

7. The process of claim 5 wherein said halogenacetone is hexachloroacetone.

8. The process of claim 1 wherein said π-allylnickel/counterion complex is dissolved in an aromatic or ethereal solvent.

9. The process of claim 1 wherein said polymerizable monomer is selected from the group consisting of (±)-1-phenylethyl isocyanide, styrene, butadiene, isoprene, ethyl vinyl ether, chloroethyl vinyl ether, vinyloxy trimethylsilane, and norbornene.

* * * * *